(12) United States Patent
Maltsev et al.

(10) Patent No.: US 8,345,781 B2
(45) Date of Patent: Jan. 1, 2013

(54) CHANNEL QUALITY ASSESSMENT METHOD IN OFDM(A) COMMUNICATIONS AND A CORRESPONDING SYSTEM

(75) Inventors: Alexander Maltsev, Nizhny Novgorod (RU); Alexey Rubstov, Novgorod (RU); Alexei Davydov, Nizhny Novgorod (RU); Sergey Tiraspolsky, Nizhny Novgorod (RU); Andrey Pudeyev, Nizhny Novgorod (RU)

(73) Assignee: Intel Corporation, Santa Clara, CA (US)

( * ) Notice: Subject to any disclaimer, the term of this patent is extended or adjusted under 35 U.S.C. 154(b) by 680 days.

(21) Appl. No.: 12/442,941

(22) PCT Filed: Sep. 29, 2006

(86) PCT No.: PCT/RU2006/000507
§ 371 (c)(1),
(2), (4) Date: Dec. 21, 2009

(87) PCT Pub. No.: WO2008/039097
PCT Pub. Date: Apr. 3, 2008

(65) Prior Publication Data
US 2010/0091894 A1    Apr. 15, 2010

(51) Int. Cl.
*H04L 27/28* (2006.01)
(52) U.S. Cl. ........ 375/260; 375/259; 375/267; 375/316; 375/340; 375/347; 375/295; 375/296
(58) Field of Classification Search ................. 375/260, 375/259, 267, 316, 340, 347, 295, 296
See application file for complete search history.

(56) References Cited

U.S. PATENT DOCUMENTS

| | | | |
|---|---|---|---|
| 7,580,400 B2 * | 8/2009 | Sung et al. | 370/342 |
| 7,706,804 B2 * | 4/2010 | Huh et al. | 455/450 |
| 2003/0095506 A1 | 5/2003 | Jalali | |
| 2005/0111406 A1 | 5/2005 | Pasanen et al. | |
| 2005/0111522 A1 * | 5/2005 | Sung et al. | 375/145 |
| 2005/0152465 A1 | 7/2005 | Maltsev et al. | |
| 2005/0159162 A1 * | 7/2005 | Park | 455/450 |
| 2006/0067417 A1 | 3/2006 | Park et al. | |
| 2007/0115880 A1 * | 5/2007 | Huh et al. | 370/329 |
| 2011/0064172 A1 * | 3/2011 | Olson et al. | 375/346 |

FOREIGN PATENT DOCUMENTS

| | | |
|---|---|---|
| EP | 1492294 | 12/2004 |
| EP | 1653762 | 5/2006 |
| JP | 2004312291 | 11/2004 |
| WO | WO-2005/122515 | 12/2005 |
| WO | WO-2005122515 | 12/2005 |
| WO | WO-2006020032 | 2/2006 |
| WO | WO-2006059565 | 6/2006 |

OTHER PUBLICATIONS

Examination Report from EP06849592.8 mailed Mar. 9, 2010, 4 pgs.
International Search Report and Written Opinion from PCT/RU2006/000507 mailed Aug. 23, 2007, 14 pgs.

* cited by examiner

*Primary Examiner* — Kenneth Lam
(74) *Attorney, Agent, or Firm* — Blakely, Sokoloff, Taylor & Zafman LLP (57) ABSTRACT

A method and apparatus for determining a channel quality indicator (CQI) to be used in link adaptation for Orthogonal Frequency Division Multiplexing (OFDM) communications. In one embodiment of the invention, the CQI is based on a set of capacity values for subcarrier components in a received OFDM signal. In another embodiment, a minimum value from a running average of the set of capacity values is used to determine the CQI.

21 Claims, 5 Drawing Sheets

CHANNEL QUALITY ASSESSMENT METHOD IN OFDM(A) COMMUNICATIONS AND A CORRESPONDING SYSTEM

CROSS-REFERENCE TO RELATED APPLICATION

This patent application is a U.S. National Phase application under 35 U.S.C. §371 of International Application No. PCT/RU2006/000507, filed on Sep. 29, 2006, entitled CHANNEL QUALITY ASSESSMENT METHOD IN OFDM(A) COMMUNICATIONS AND A CORRESPONDING SYSTEM.

BACKGROUND OF THE INVENTION

1. Field of the Invention

The invention relates generally wireless to communications technology. More particularly, an embodiment of the invention determines signal characteristics for transmissions using Orthogonal Frequency Division Multiplexing (OFDM).

2. Background Art

Modern wireless communication systems frequently rely on the advantages of OFDM and Orthogonal Frequency Division Multiple Access (OFDMA) techniques, referred to collectively herein as OFDM(A). In particular, wireless technology commonly implements Institute of Electrical and Electronics Engineers (IEEE) standards such as the IEEE 802.16 standards for Wireless Metropolitan Area Networks (WMANs), including the IEEE 802.16e IEEE Standard for Local and Metropolitan Area Networks—Part 16: Air Interface for Fixed Broadband Wireless Access Systems-Physical and Medium Access Control Layers for Combined Fixed and Mobile Operation in Licensed Bands, 2004.

One of the advantages of OFDM(A) communications is the ability to use link adaptation (LA), wherein modulation, coding and other signal or protocol parameters can be adjusted according to the signal transmission environment. Fast link adaptation methods significantly improve throughput and data packet error rate (PER) performance of OFDM(A) system in a noise-limited environment and in an interference-limited environment. Several fast link adaptation methods are known for OFDM(A) systems—most of them are based on some calculation of a channel quality indicator (CQI). Fast and reliable link adaptation in an OFDM(A) systems depends on a measure of channel quality which remains accurate across a range of channel environments.

BRIEF DESCRIPTION OF THE DRAWINGS

The various embodiments of the present invention are illustrated by way of example, and not by way of limitation, in the figures of the accompanying drawings and in which.

DETAILED DESCRIPTION

Techniques and architectures for evaluating signal characteristics in wireless communications are described herein. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed descriptions which follow are presented in terms of algorithms and symbolic representations of operations on data bits within a computer memory. These algorithmic descriptions and representations are the means used by those skilled in the communications arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

An embodiment determines a CQI for use in various link adaptation methods for OFDM(A) communication systems. Embodiments of the invention are suitable for WMAN IEEE 802.16 systems, which are used for illustration herein. Based on a CQI determined according to the methods described herein, an OFDM(A) transceiver implementing an LA scheme can derive other information about the channel quality to adaptively select a modulation coding scheme (MCS) for data transmissions.

Figure 1:
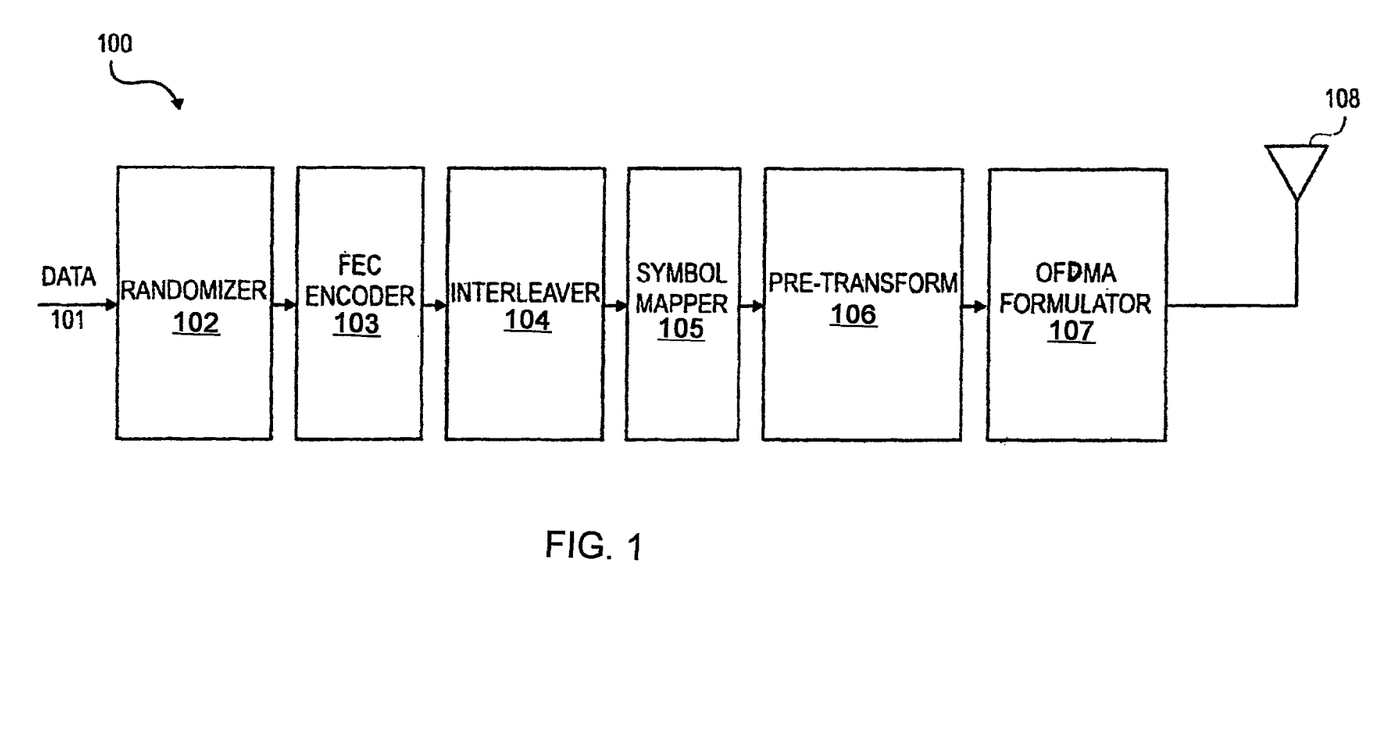
FIG. 1 is a block diagram illustrating a scheme for preparing an OFDM(A) signal for transmission.

FIG. 1 is a block diagram illustrating a downlink transmitter 100 used to transmit an OFDM(A) signal. The data 101 may be received by the downlink transmitter 100 at a randomizer 102. The randomized signal may then be sent to a forward error correction (FEC) encoder 103, followed by an interleaver 104. This interleaved signal may then be passed to a symbol mapper 105 to perform bit-to-symbol mapping of the FEC data. The mapped symbols, together with preamble and pilot symbols (not shown), may then be passed to the pre-transform device 106 and OFDMA formulator 107 for linear transformation and OFDM formulation of the signal before transmission. The final output signal may then be transmitted through a transmit antenna 108. The output OFDM(A) signal of transmit antenna 108 is of a type which is received and evaluated to determine a CQI according to one embodiment. FIG. 1 illustrates one scheme for preparing this type of OFDM(A) signal. The invention is not limited in the context of the scheme used to prepare this type of OFDM(A) signal for transmission.

Figure 2:
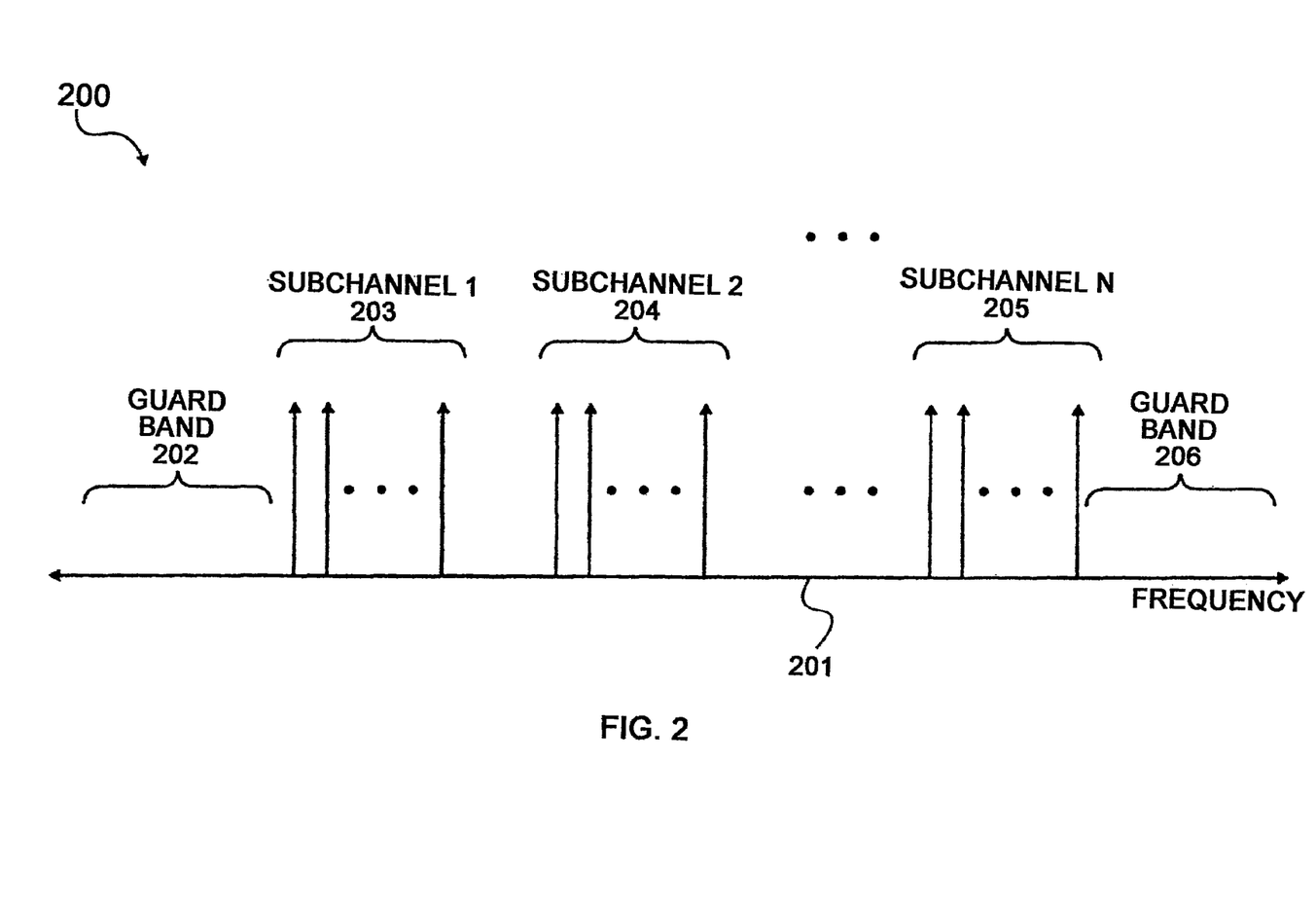
FIG. 2 is a frequency diagram illustrating subcarriers of an OFDM(A) signal.

FIG. 2 illustrates in the frequency domain 201 an OFDM (A) signal of a type received and analyzed by a system or device implementing one embodiment. In various embodiments, the received signal may be formatted according to the IEEE 802.16e standard. The signal is received in an OFDM (A) channel 200 which is delimited by guard bands 202, 206. In the frequency domain, the subcarriers of a given OFDM symbol are divided into groups of subchannels 203, 204, 205. Subcarriers belonging to a given subchannel may or may not be adjacent to one another. A localized subchannel is one having subcarriers which are contiguous in the frequency domain. A distributed subchannel, having non-contiguous subcarriers, can provide frequency diversity to protect transmissions. Various subchannel arrangements may be used.

In typical implementations, the OFDM(A) signal is mixed at the receiver side with noise inherent to the receiver. The OFDM(A) signal may be further mixed at the receiver side with both direct and multi-path interference from neighboring BSs or other OFDM(A) transmitters. In these conditions, successful selection of an MCS for link adaptation depends in part on accurate prediction of signal error rates of the channel, such as the slot error rate (SLER) and the packet error rate (PER). Typically, link adaptation techniques select an MCS or other wireless communications parameter based on measurements or system modeling data which associate a given error rate to a communications mode that yields the largest throughput while remaining within an error rate target bounds. The usefulness of error rate information depend on a measure of channel quality which remains accurate across a range of channel environments. Various embodiments provide improved accuracy of SLER/PER prediction for OFDM (A) receivers by using as a channel quality indicator a minimal value of mean subcarrier capacities, which is calculated within moving window. This "min-mean" capacity value, $C_{mm\_wndw}$, offers particularly accurate SLER/PER predictions in systems exploiting convolutional code, a mandatory coding scheme under the IEEE 802.16 standard. $C_{mm\_wndw}$ is calculated according to the methods described herein.

Figure 3:
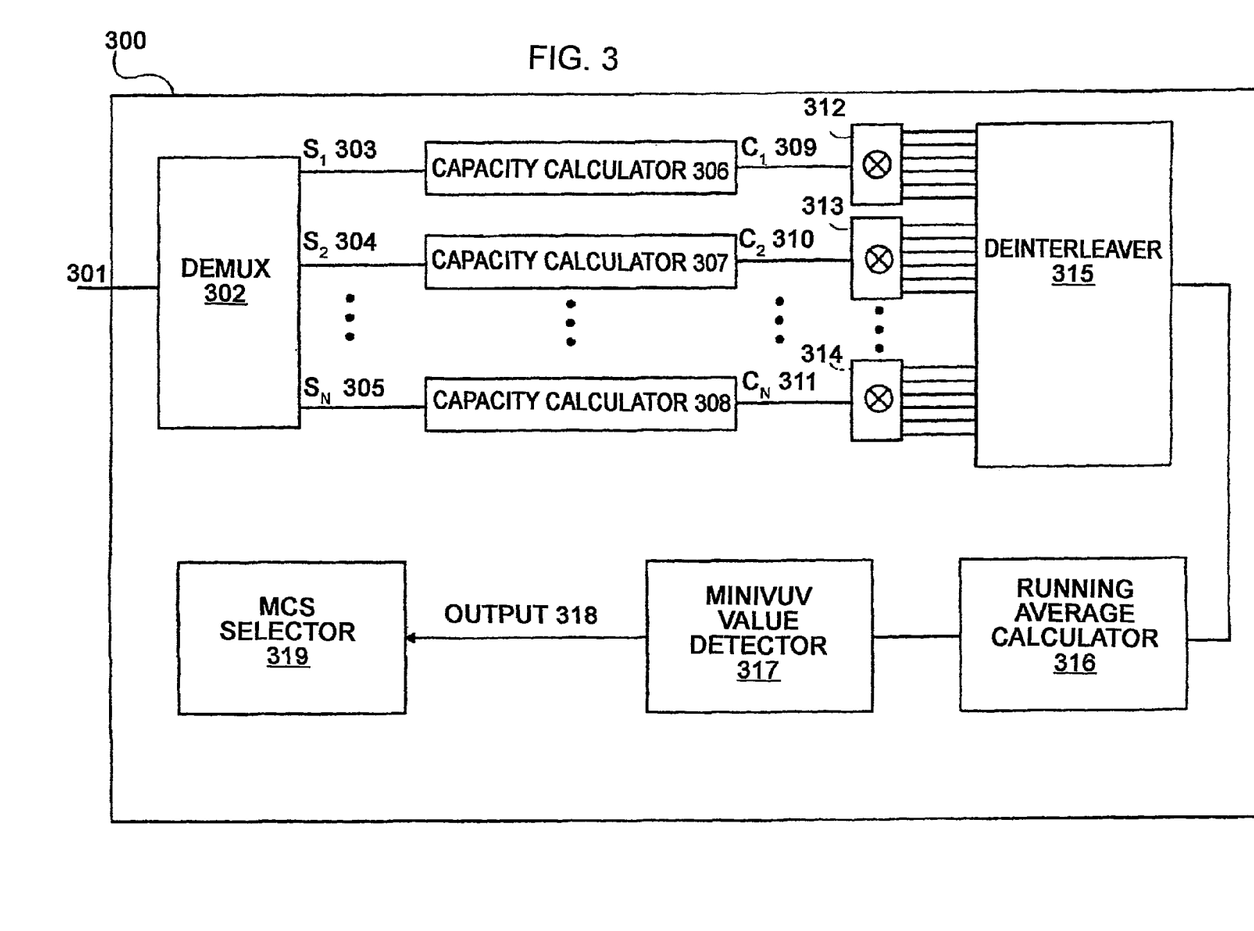
FIG. 3 is a block diagram illustrating a system to determine a channel quality indicator based on a received OFDM(A) signal.

FIG. 3 illustrates a system or device 300 implementing one embodiment. In various embodiments, a system or device may be implemented as, software, a software module, an application, a program, a subroutine, an instruction set, computing code, words, values, symbols or combination thereof. A system or device may be implemented according to a predefined computer language, manner or syntax, for instructing a processor to perform a certain function. Examples of a computer language may include C, C++, Java, BASIC, Perl, Matlab, Pascal, Visual BASIC, assembly language, machine code, micro-code for a network processor, and so forth. In alternative embodiments, hard-wired circuitry can be used in place of or in combination with software instructions to implement the invention. Thus, the invention is not limited to any specific combination of hardware circuitry and software instructions.

In various implementations, the system or device 300 may form part of a multi-carrier system such as a Multiple Input, Multiple Output (MIMO) system for conveying multiple data streams to multiple antennas. In such embodiments, the wireless communications media may comprise one or more multi-carrier communications channels for communicating multi-carrier communication signals. A multi-carrier channel may comprise, for example, a wideband channel comprising multiple sub-channels. The embodiments are not limited in this context.

The system or device 300 may form part of a network. The network may be any of a variety of OFDM(A) networks such as one compliant with the IEEE 802.16e standard, a Worldwide Interoperability for Microwave Access (WiMAX) network, a broadband wireless access (BWA) network, a wireless local area network (WLAN), a wireless wide area network (WWAN), a wireless metropolitan area network (WMAN), or a wireless personal area network (WPAN). The system or device 300 may communicate information in accordance with one or more standards, such as standards promulgated by the Institute of Electrical and Electronics Engineers (IEEE), In various embodiments, for example, the system or device 300 may communicate information according to one or more IEEE 802 standards including IEEE 802.11g (release date June 2003) for WLANs and/or 802.16 standards (e.g., 802.16-2004, 802.16.2-2004 and variants) for WMANs.

The system or device 300 may comprise or be implemented by a wireless network such as a BWA network, for example. In various implementations, the wireless network may be arranged to operate according to one or more IEEE 802.16 standards. In various embodiments, the wireless network may comprise an 802.16e network operating according to the including the IEEE 802.16e Standard for Local and Metropolitan Area Networks—Part 16: Air Interface for Fixed Broadband Wireless Access Systems—Physical and Medium Access Control Layers for Combined Fixed and Mobile Operation in Licensed Bands, 2004. The embodiments are not limited in this context. The system or device 300 illustrates the calculation of a channel quality indicator according to one embodiment of the invention. An OFDM data block 301 is received into the system or device 300 as input to a demultiplexer 302. This OFDM block may be received by a substantially omni-directional antenna coupled to the system or device 300. The OFDM data block comprises a plurality of multiplexed subcarrier components $S_1$ 303, $S_2$ 304 . . . $S_N$ 305. The demultiplexer 302 separates the data block 301 into the constituent subcarrier signals $S_1$ 303, $S_2$ 304 . . . $S_N$ 305 of the data block 301. The subcarrier signals $S_1$ 303, $S_2$ 304 . . . $S_N$ 305 are each sent to corresponding capacity calculators 306, 307, . . . 308, which then output an array of subcarrier capacity values $C_1$ 309, $C_2$ 310, . . . $C_N$ 311. Here an "array" may alternately be described as an ordered set-in this case ordered based on the frequency domain order of the subcarrier frequencies. The subcarrier capacity values $C_1$ 309, $C_2$ 310, . . . $C_N$ 311 are sent through corresponding replicators 312, 313, . . . 314. Replication of the elements in an array of subcarrier capacity values is determined by a modulation scheme used in preparing the data block for transmission on the transmitter side. Each replicator provides as output a number of equivalent "bit" capacity values representing the corresponding input subcarrier capacity value. In various embodiments, any one bit capacity value may be identical to the corresponding input subcarrier capacity value. The number of replicated bit capacity values provided by each replicator 312, 313, . . . 314 is based on the order of modulation used to create the data block 301.

The output of replicators 312, 313, . . . 314 may be input to the deinterleaver 315 as an ordered array of bit capacity values. In an embodiment of the invention, the deinterleaver 315 may reverse an interleaving operation used to form the data block 301. The resulting sequence of deinterleaved bit capacity values may be input to a moving average calculator 316, which calculates a moving average of the deinterleaved sequence using a predetermined window size for sampling. The selection of a window size may be circumscribed by the scheme used to generate the received data signal and/or by a desired speed and accuracy of the link adaptation method. A moving average is alternately known as a moving mean. The resulting sequence of moving mean values may be input to a minimum value detector 317, which will determine the minimum moving mean value of capacity values, $C_{mm\_wndw}$, sent as output 318 In varying embodiments, a single calculating agent may be used to determine output $C_{mm\_wndw}$ 318 based on the subcarrier capacity values $C_1$ 309, $C_2$ 310, . . . $C_N$ 311. The output $C_{mm\_wndw}$ 318 may then be used for selection of link adaptation techniques, for example by an MCS selector 319.

FIGS. 4A through 4E illustrate graphically the results of calculations preformed according to one embodiment. In this embodiment, a BS transmits a data packet comprised of one or more data blocks using a band of subcarriers known to a receiving mobile unit. The mobile unit may use signal characteristics of the received data block to calculate the channel quality indicator $C_{mm\_wndw}$ to evaluate the channel environment and to choose an MCS for transmitting a subsequent data packet in that environment.

Figure 4A:
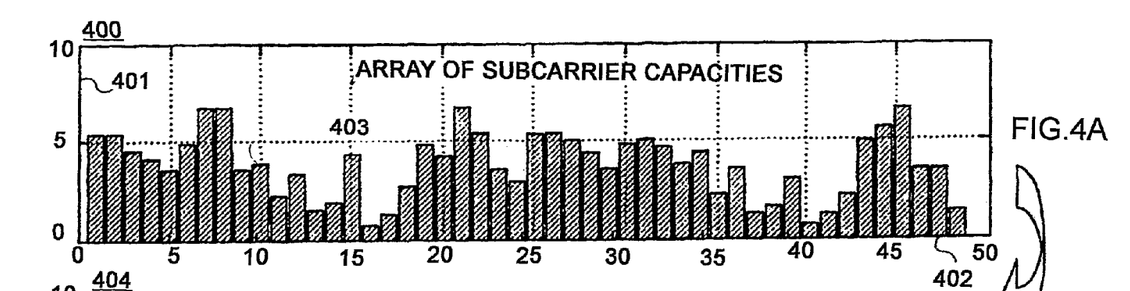
FIG. 4a is a graph illustrating an array of OFDM(A) subcarrier channel capacities calculated according to one embodiment of the invention.

FIG. 4A illustrates an array of subcarrier capacities for the subcarriers used to transmit the data block received by the mobile unit. The chart 400 comprises a domain of subcarrier capacities 402 used to transmit the data block, arranged according to their order in the frequency domain. In varying embodiments, the subcarriers are localized.

The chart further comprises a range of capacity values 401, where a given capacity value is a unitless number. In this embodiment of the invention, the capacity C of a given subcarrier is calculated based on the Shannon formula:

$$C = \log_2(1 + SINR_{Eff}) \quad (1)$$

Where $SINR_{Eff}$ is an instantaneous post-processing signal to interference-plus-noise ratio for the given subcarrier. Post processing means that this $SINR_{Eff}$ value is calculated after all required processing such as maximum ratio combining or Alamouti decoding has taken place to improve the signal to interference-plus-noise ratio of the given subcarrier. An exemplary subcarrier capacity value 403 is shown for illustration.

Figure 4B:
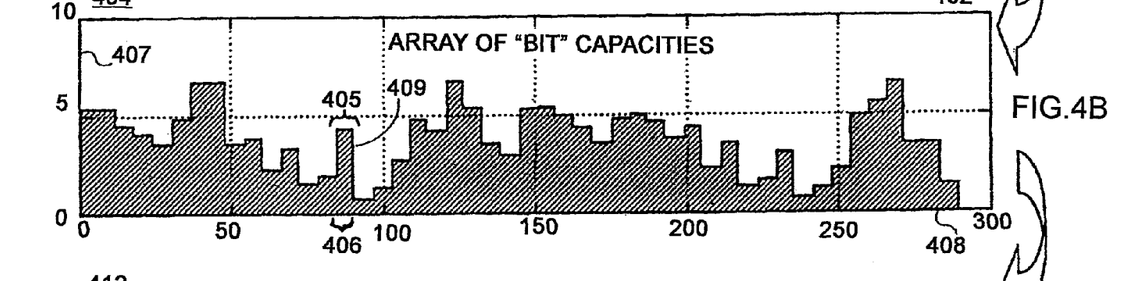
FIG. 4b is a graph illustrating an array of OFDM(A) subcarrier "bit" capacities calculated according to one embodiment of the invention.

FIG. 4B illustrates transformation of the array of subcarrier capacities into an array of bit capacity values. The chart 404 comprises a domain of bit capacities 408 and a range of capacity values 407, where a given bit capacity value is a unitless number. This transformation expands each element in the array of subcarrier capacities into a multiple of array elements, where the multiple is determined by the modulation order for the OFDM modulation used to prepare the data block for transmission. For a simplified example, if a Quadrature Phase-shift Keying (QPSK) modulated data block is received on 4 subcarriers having an array of subcarrier capacities values [1.23, 2.45, 0.37, 4.28], the resulting array of bit capacity values would be [1.23, 1.23, 2.45, 2.45, 0.37, 0.37, 4.28, 4.28], since the order of modulation for QPSK modulation is 2. In this example, the subcarrier capacity value 403 has been repeated as a set of bit capacity values 405, including an exemplary bit capacity value 409, for a group of subcarrier "bits" 406 corresponding to the subcarrier having capacity value 403.

Figure 4C:
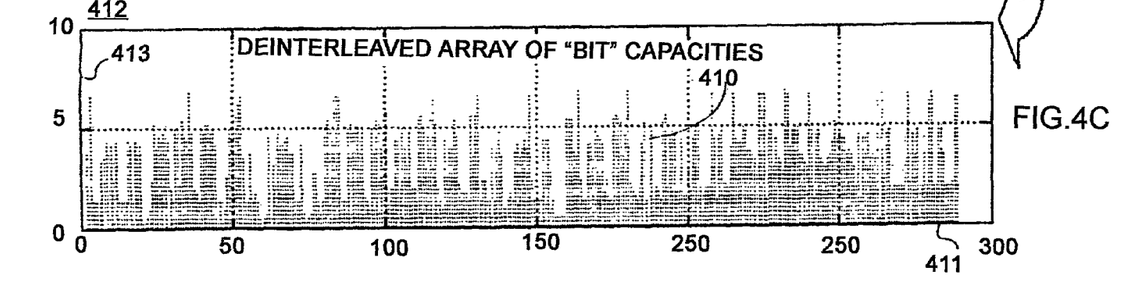
FIG. 4c is a graph illustrating a deinterleaved array of OFDM(A) subcarrier "bit" capacities calculated according to one embodiment of the invention.

FIG. 4C illustrates deinterleaving of the array of bit capacities in FIG. 4B. Interleaving (deinterleaving) is a common procedure of bit mixing after encoding (before decoding) of a data block to gain additional broadband communication system robustness in frequency selective channels. Interleaving (deinterleaving) is a procedure which is usually defined in the standard which specified the communication system. For IEEE 802.16 systems, the bit deinterleaver used is a block deinterleaver. In block deinterleaving, bits are first read into an array of dimension $N_{col} \times N_{row}$. In an example from IEEE 802.16, $N_{col}=16$ and $N_{row}=N_{CBPB}/N_{col}$ where $N_{CBPB}$ is the number of coded bits per FEC block. The bits are first read into the $N_{col} \times N_{row}$ array column-by-column and are then read out of the $N_{col} \times N_{row}$ array row-by-row. The choice of deinterleaving process is implementation specific. The graph 412 in FIG. 4C, having a domain of bit capacities 411 and a range of capacity values 413, illustrates movement of the bit capacity 409 from its initial position to a deinterleaved position 410 along the domain of deinterleaved bit capacity values 411.

Based on the scheme which was used to prepare the data block at the BS for transmission, various embodiments of the invention may include one or more additional processes to act as the inverse of operations in said preparation scheme. The invention is not limited in regard to the addition of these additional processes, which are not shown in the example illustrated in FIGS. 4A-4E.

Figure 4D:
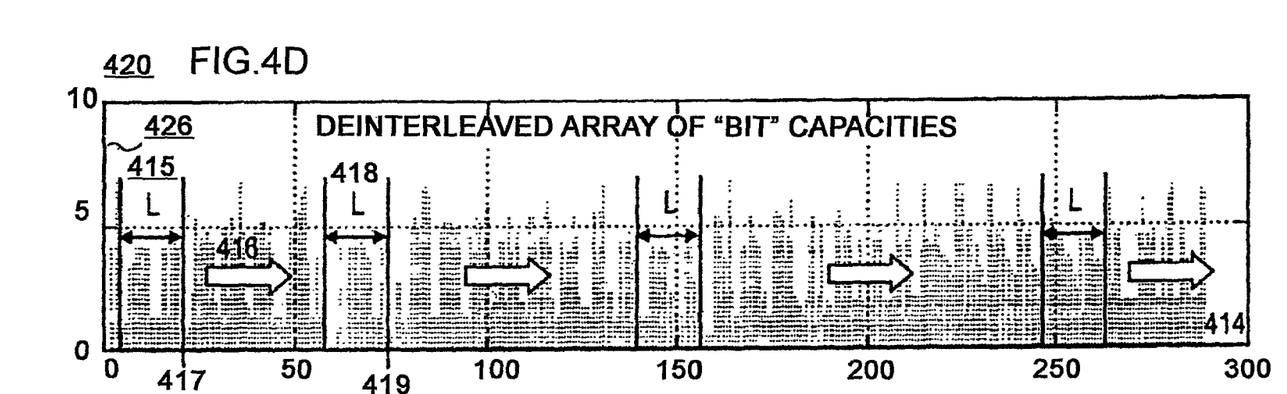
FIG. 4d is a graph illustrating the calculation of a moving average of the deinterleaved array of OFDM(A) subcarrier "bit" capacities.

FIG. 4D illustrates calculation of a moving mean of the deinterleaved bit capacity values.

The chart 420 in FIG. 4D comprises a domain of bit capacities 414 and a range of bit capacity values 426, where a given bit capacity value is a unitless number. The moving mean sets a sampling range 415 of size L, and calculates the mean value of the deinterleaved bit capacity values in that part of the domain 417 as the sample range moves 416 along the domain 413 to another position 418 where the moving mean is calculated for another part of the domain 419.

For varying embodiments of the invention, the sampling size, alternately known as a window size, should be connected with some parameter of the convolutional coder used to prepare the data block for transmission. For example, in one embodiment, the constraint length of a convolutional encoder determines the window size used in calculating the moving mean. For IEEE 802.16 systems, a window size equal 14, i.e. twice the constraint length of the convolutional encoder for IEEE 802.16, leads to a reliable $C_{mm\_wndw}$.

Figure 4E:
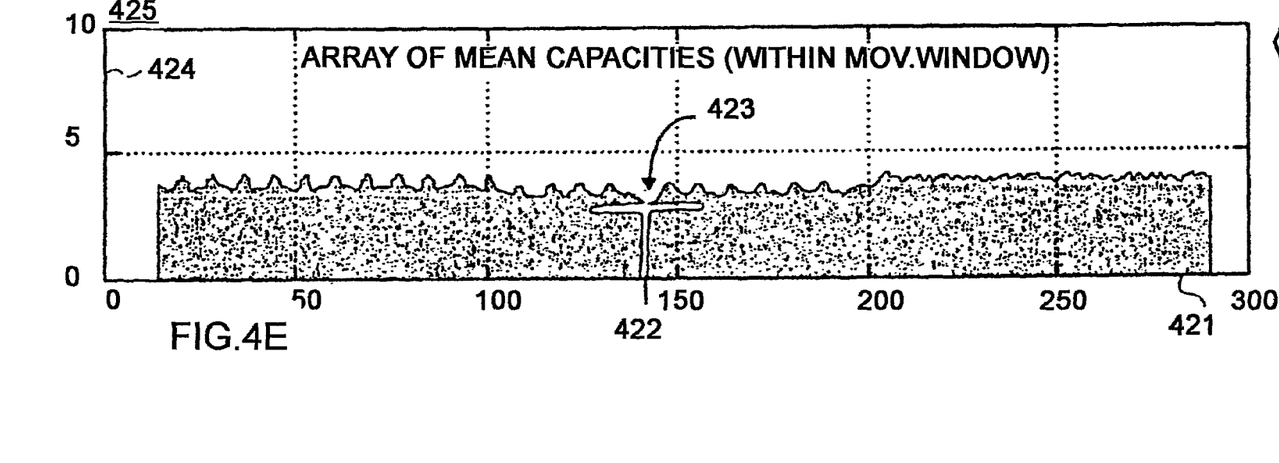
FIG. 4e is a graph illustrating the determination of a channel quality indicator (CQI) according to an embodiment of the invention.

FIG. 4E illustrates determination of a minimum in the moving mean of deinterleaved bit capacity values. The chart 425 in FIG. 4E comprises a domain of subcarrier bits 421 and a range of running mean capacity values 424, where a given running mean capacity value is a unitless number. It is straightforward to identify the minimal value 423—located along the domain 421 at 422—which is the channel quality indicator $C_{mm\_wndw}$.

Once identified, the channel quality indicator $C_{mm\_wndw}$ can be used to select a MCS for the transmission of an OFDM (A) signal. In varying embodiments of the invention, the channel quality indicator $C_{mm\_wndw}$ can be used to determine an operational band of subcarriers in an OFDM(A) channel, or adjust a level of transmission power for a set of subcarriers in an OFDM(A) channel. The invention is not limited in this context.

While the invention has been described in terms of several embodiments, those skilled in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
    generating an initial set of bit capacity values, including:
        for each subcarrier capacity value of a set of subcarrier capacity values, expanding the subcarrier capacity value based on a modulation order, the expanding to generate multiple respective ones of the set of bit capacity values,
    wherein an order of the initial set of bit capacity values is according to the frequencies of the set of subcarrier capacity values;
        deinterleaving the initial set of bit capacity values to determine an ordered set of bit capacity values for subcarriers of an orthogonal frequency division multiplexed (OFDM) communication channel;
        selecting a sample size to determine a moving average of the ordered set of bit capacity values;
        determining an ordered set of average bit capacity values representing a moving average of the ordered set of bit capacity values based on the selected sample size; and
        identifying a channel quality indicator (CQI) of the OFDM communication channel, the identifying including selecting a minimal value from the ordered set of average bit capacity values.

2. The method of claim 1, wherein the OFDM communication channel complies with the Institute of Electrical and Electronics Engineers (IEEE) 802.16 standard.

3. The method of claim 1, wherein generating the initial set of bit capacity values further comprises:
    receiving a subcarrier signal via a subcarrier of the OFMD communication channel, the subcarrier signal including a transmitted signal, signal interference and signal noise; and
    calculating a subcarrier capacity value of the subcarrier substantially based on a signal to interference-and-noise ratio (SINR) of the subcarrier signal, the SINR including a quotient of a strength of the transmitted signal and a combined strength of the signal interference and signal noise.

4. The method of claim 3 wherein determining the ordered set of bit capacity values further comprises ordering the set of subcarrier capacity values based on an order of the subcarriers in a frequency domain.

5. The method of claim 1 further comprising:
    selecting a link adaptation parameter for a signal transmission based on the CQI.

6. The method of claim 5 wherein the link adaptation parameter is a modulation coding scheme (MCS).

7. An apparatus comprising:
    a signal processor to generate an initial set of bit capacity values, wherein, for each subcarrier capacity value of a set of subcarrier capacity values, the signal processor to expand the subcarrier capacity value based on a modulation order to generate multiple respective ones of the set of bit capacity values, wherein an order of the initial set of bit capacity values is according to the frequencies of the set of subcarrier capacity values; and
    a calculating agent to deinterleave the initial set of bit capacity values to determine an ordered set of bit capacity values for subcarriers of an orthogonal frequency division multiplexed (OFDM) communication channel, and to select a sample size to determine a moving average of the ordered set of bit capacity values, the calculating agent further to determine an ordered set of average bit capacity values representing a moving average of the ordered set of bit capacity values based on the selected sample size, the calculating agent further to identify a channel quality indicator (CQI) of the OFDM communication channel, wherein the calculating agent to select a minimal value from the ordered set of average bit capacity values.

8. The apparatus of claim 7, wherein the OFDM communication channel complies with the IEEE 802.16 standard.

9. The apparatus of claim 7, wherein the signal processor to generate the initial set of bit capacity values further comprises:
    the signal processor to receive a subcarrier signal via a subcarrier of the OFDM communication channel, the subcarrier signal including a transmitted signal, signal interference and signal noise; and
    the signal processor to calculate the capacity value of the subcarrier substantially based on a SINR of the subcarrier signal, the SINR including a quotient of a strength of the transmitted signal and a combined strength of the signal interference and signal noise.

10. The apparatus of claim 9 wherein the signal processor to determine the ordered set of bit capacity values comprises the signal processor to order the initial set of bit capacity values based on an order of the subcarriers in a frequency domain.

11. The apparatus of claim 7 wherein the calculating agent further to select a MCS for a signal transmission based on the CQI.

12. A system comprising:
    a substantially omnidirectional antenna to receive signals on one or more subcarriers of an OFDM communication channel.
    a signal processor to generate an initial set of bit capacity values, wherein, for each subcarrier capacity value of a set of subcarrier capacity values, the signal processor to expand the subcarrier capacity value based on a modulation order to generate multiple respective ones of the set of bit capacity values, wherein an order of the initial set of bit capacity values is according to the frequencies of the set of subcarrier capacity values; and a calculating agent to deinterleave the initial set of bit capacity values to determine an ordered set of bit capacity values for the one or more subcarriers of the OFDM communication channel, and to select a sample size to determine a moving average of the ordered set of capacity values, the calculating agent further to determine an ordered set of average bit capacity values representing a moving average of the ordered set of bit capacity values based on the selected sample size, the calculating agent further to identify a channel quality indicator (CQI) of the OFDM communication channel, wherein the calculating agent to select a minimal value from the ordered set of average bit capacity values.

13. The system of claim 12, wherein the OFDM communication channel complies with the IEEE 802.16 standard.

14. The system of claim 12, wherein the signal processor to generate the initial set of bit capacity values further comprises:

the signal processor to receive a subcarrier signal via a subcarrier of the OFDM communication channel, the subcarrier signal including a transmitted signal, signal interference and signal noise; and the signal processor to calculate the capacity value of the subcarrier substantially based on a SINR of the subcarrier signal, the SINR including a quotient of a strength of the transmitted signal and a combined strength of the signal interference and signal noise.

15. The system of claim 14 wherein the signal processor to determine the ordered set of bit capacity values comprises the signal processor to order the initial set of bit capacity values based on an order of the subcarriers in a frequency domain.

16. The system of claim 12 wherein the calculating agent further to select a MCS for a signal transmission based on the CQI.

17. A non-transitory machine-readable storage having stored thereon instructions which, when executed by a set of one or more processors, cause said set of processors to perform a method comprising:

generating an initial set of bit capacity values, including:
for each subcarrier capacity value of a set of subcarrier capacity values, expanding the subcarrier capacity value based on a modulation order, the expanding to generate multiple respective ones of the set of bit capacity values,
wherein an order of the initial set of bit capacity values is according to the frequencies of the set of subcarrier capacity values;

deinterleaving the initial set of bit capacity values to determine an ordered set of bit capacity values for subcarriers of an orthogonal frequency division multiplexed (OFDM) communication channel;

selecting a sample size to determine a moving average of the ordered set of bit capacity values;

determining an ordered set of average bit capacity values representing a moving average of the ordered set of bit capacity values based on the selected sample size; and identifying a channel quality indicator (CQI) of the OFDM communication channel, the identifying including selecting a minimal value from the ordered set of average bit capacity values.

18. The non-transitory machine-readable storage of claim 17 wherein the OFDM communication channel complies with the Institute of Electrical and Electronics Engineers (IEEE) 802.16 standard.

19. The non-transitory machine-readable storage of claim 17 wherein generating the initial set of bit capacity values comprises:

receiving a subcarrier signal via a subcarrier of the OFMD communication channel, the subcarrier signal including a transmitted signal, signal interference and signal noise; and calculating a subcarrier capacity value of the subcarrier substantially based on a SINR of the subcarrier signal, the SINR including a quotient of a strength of the transmitted signal and a combined strength of the signal interference and signal noise.

20. The non-transitory machine-readable storage of claim 19 wherein determining the ordered set of bit capacity values further comprises ordering the set of subcarrier capacity values based on an order of the subcarriers in a frequency domain.

21. The non-transitory machine-readable storage of claim 17, the method further comprising selecting a MCS for a signal transmission based on the CQI.

* * * * *